United States Patent [19]
Cantrell et al.

[11] Patent Number: 5,857,810
[45] Date of Patent: Jan. 12, 1999

[54] IN-SITU CHEMICAL BARRIER AND METHOD OF MAKING

[75] Inventors: Kirk J. Cantrell, West Richland; Daniel I. Kaplan, Richland, both of Wash.

[73] Assignee: Battelle Memorial Institute, Richland, Wash.

[21] Appl. No.: 807,616

[22] Filed: Feb. 27, 1997

Related U.S. Application Data

[63] Continuation-in-part of Ser. No. 553,216, Nov. 7, 1995, abandoned.

[51] Int. Cl.$^6$ .................................................. B09B 3/00
[52] U.S. Cl. ....................... 405/263; 588/250; 588/260; 404/128
[58] Field of Search ................................ 405/128, 266, 405/52, 267; 166/292, 293, 308, 305; 106/811, 900

[56] References Cited

U.S. PATENT DOCUMENTS

| | | | |
|---|---|---|---|
| 1,430,306 | 9/1922 | Francois | 405/266 |
| 3,407,605 | 10/1968 | Coffer et al. | 405/267 X |
| 4,266,889 | 5/1981 | Rail et al. | 405/223 |
| 4,540,316 | 9/1985 | Takahashi | 405/266 X |
| 4,705,431 | 11/1987 | Gadelle et al. | 405/266 X |
| 4,762,443 | 8/1988 | Gouvenot | 405/266 X |
| 4,930,576 | 6/1990 | Berryman et al. | 405/267 X |
| 5,030,036 | 7/1991 | Huff et al. | 405/266 |
| 5,226,749 | 7/1993 | Perkins | 175/66 X |
| 5,389,146 | 2/1995 | Liao | 405/266 X |

OTHER PUBLICATIONS

Ground Water Currents, "In situ Degradation of Halogenated Organics by Permeable Reaction Wall", O'Hannesin et al.,.

Environmental Remediation Technology, "Canadian Firm Uses Iron Filings to Destroy VOC's in Ground Water", 1993.

Envirometal Technologies Inc., brochure.

Metal Enhanced Abiotic Degradation Of Halogenated Aliphatics: Laboratory Tests And Field Trails, Gillham et al. HazMat Central Conference, 1993.

Metal–Catalysed Abiotic Degradation Of Halogenated Organic Compounds, Gillham et al. IAH Conference, 1992.

A Permeable Reaction Wall For In Situ Degradation Of Halogenated Organic Compounds, O'Hannesin et al., 1992.

Geochemical Remediation Of Groundwater By Permeable Reactive Walls: Removal Of Chromate With Iron–Bearing Solids, Blowes et al., 1992.

Primary Examiner—Dennis L. Taylor
Attorney, Agent, or Firm—Paul W. Zimmerman

[57] ABSTRACT

A chemical barrier is formed by injecting a suspension of solid particles or colloids into the subsurface. First, a stable colloid suspension is made including a surfactant and a non-Newtonian fluid. This stable colloid suspension is characterized by colloid concentration, colloid size, colloid material, solution ionic strength, and chemical composition. A second step involves injecting the optimized stable colloid suspension at a sufficiently high flow rate to move the colloids through the subsurface sediment, but not at such a high rate so as to induce resuspending indigenous soil particles in the aquifer. While injecting the stable colloid suspension, a withdrawal well may be used to draw the injected colloids in a direction perpendicular to the flow path of a contaminant plume. The withdrawal well, may then be used as an injection well, and a third well, in line with the first two wells, may then be used as a withdrawal well, thereby increasing the length of the colloid barrier. This process would continue until emplacement of the colloid barrier is complete.

32 Claims, 7 Drawing Sheets

IN-SITU CHEMICAL BARRIER AND METHOD OF MAKING

This application is a continuation-in-part of application Ser. No. 08/553,216, filed Nov. 7, 1995, now abandoned.

This invention was made with Government support under Contract DE-AC06-76RLO 1830 awarded by the U.S. Department of Energy. The Government has certain rights in the invention.

FIELD OF THE INVENTION

The present invention relates generally to a method of making a chemical barrier in the subsurface environment. More specifically, the invention is a method for injecting solid particles into the subsurface environment.

BACKGROUND OF THE INVENTION

Throughout the nation and the world, industrial chemicals have been disposed by burying containers or by simply dumping chemical liquids onto the ground. Over time, buried containers degrade and leak, and the ground dumped liquids slowly seep permitting the chemical liquids to find their way into groundwater and surface water.

The few chemical barriers which have been constructed have been formed by the trench-and-fill technique, i.e., digging a trench in the flow path of a contaminant plume and then refilling the trench with a material that will either sequester (sorb or precipitate) or destroy the contaminant (Gillham, R. W., S. F. O'Hannesin, and W. W. Orth. 1993. Metal enhanced abiotic degradation of halogenated aliphatics: Laboratory tested and field trials, pp. 1–21. In: Papers Presented at the 1993 HazMat Central Conference. Mar. 9–11, 1993. Chicago, Ill.). The selection of the materials used for chemical barriers is dependent on the targeted contaminant, the remediation objective, and site conditions. In addition to these materials being good sequestering agents, they must also be inexpensive and possess a sufficiently high hydraulic conductivity to promote groundwater flow through the chemical barrier. Numerous materials have been proposed for "trench-and-fill" barriers including zeolite minerals, minerals modified with surface-bound chelates and quaternary amines, organic peat, limestone, titanium hydroxide, titanium oxide, fly ash, saw dust, lignite, hematite, magnetite, goethite, hydroxyapatite, andisols for anions, and zero-valent iron, $Fe^0$. In the situation where an organic contaminant is destroyed by the chemical barrier (typically through chemical reduction or oxidation), the barrier itself can be left in place with minimal disturbance to the surface environment. In the situation where inorganic contaminants are sequestered by the barrier, the barrier may be left in the ground where it would be expected to release contaminants at a much slower rate than the natural sediment. If it is deemed necessary, the barrier and the concentrated contaminants could be excavated.

Trench-and-fill chemical barriers made of zero valent iron, $Fe^0$, have been successfully field-demonstrated at a number of sites including a trichloroethylene plume in Sunnyvale, Calif., a trichloroethylene and tetrachloroethylene plume at the Borden Air Force Base, Canada (Gillham et al., 1993), a chlorinated hydrocarbon and chromate plume at the U.S. Coast Guard Support Center near Elizabeth City, N.C., and a chlorinated hydrocarbon plume at a former semiconductor manufacturing facility in the San Francisco Bay area. Although effective chemically, trench-and-fill remediation is costly and can only be used to remediate shallow plumes.

Another remediation of contaminated groundwater using extraction and surface treatment approaches (pump-and-treat) has repeatedly been shown to be an extremely costly proposition and the results have been generally ineffective.

Accordingly, there is a need for a cost effective method of intercepting the chemical liquids and preventing them from entering the groundwater and surface water.

SUMMARY OF THE INVENTION

A chemical barrier is formed by injecting a suspension of solid particles or colloids into the subsurface. First, a stable colloid suspension is made. This stable colloid suspension is characterized by colloid concentration, colloid size, colloid material, solution ionic strength, and chemical composition. A second step involves injecting the optimized stable colloid suspension at a sufficiently high flow rate to move the colloids through the subsurface sediment, but not at such a high rate so as to induce resuspension of indigenous soil particles in the aquifer. As the suspension of solid particles or colloids moves through the aquifer material, the solid particles are filtered out on the surfaces of the aquifer matrix. As a result of the high density of the $Fe^0$ particles (7.6 g/cm$^3$), a primary removal mechanism of $Fe^0$ colloids in aqueous solution passing through sand columns is gravitational settling. Accordingly, the use of shearthinning or pseudoplastic viscosity amendments has been found to improve the emplacement of the colloidal $Fe^0$ in porous media. In contrast to a Newtonian fluid, whose viscosity is by definition independent of shear rate, certain non-Newtonian fluids are shearthinning, a phenomena in which the viscosity of the fluid decreases with increasing shear rate.

While injecting the stable colloid suspension, a withdrawal well may be used to draw the injected colloids in a direction perpendicular to the flow path of a contaminant plume. The withdrawal well, may then be used as an injection well, and a third well, in line with the first two wells, may then be used as a withdrawal well, thereby increasing the length of the colloid barrier. This process would continue until emplacement of the colloid barrier is complete.

Advantages of barriers or zones made by the method of the present invention include avoiding excavation of large volumes of geological material reducing the cost of barrier emplacement and increasing the depth to which a zone may be placed. A colloid barrier has the distinct advantage that it can be formed non-obtrusively; the injected barrier can be added to already existing barriers without adversely affecting the latter. Finally, if groundwater monitoring deemed it necessary, colloids could be added to the existing chemical barrier at a later date with a minimal amount of cost or disturbance to the above-ground area.

Advantages of shearthinning fluids include (1) greatly improving the emplacement profile of suspensions of micron size $Fe^0$ particles in porous media relative to suspensions without shearthinning fluids, and (2) permitting the use of much lower flow rates than would be possible without them thereby decreasing the number of injection wells required to emplace the barrier and subsequently decreasing the installation cost of the barrier. This will greatly increase the range of subsurface environments that this emplacement technology can be used.

It is an object of the present invention to provide a method of injecting solid particles (colloids) into the subsurface environment for the purpose of reacting with chemical contaminant plumes.

The subject matter of the present invention is particularly pointed out and distinctly claimed in the concluding portion of this specification. However, both the organization and method of operation, together with further advantages and objects thereof, may best be understood by reference to the following description taken together with the accompanying drawings wherein like reference characters refer to like elements.

DESCRIPTION OF THE PREFERRED EMBODIMENT(S)

Figure 1:
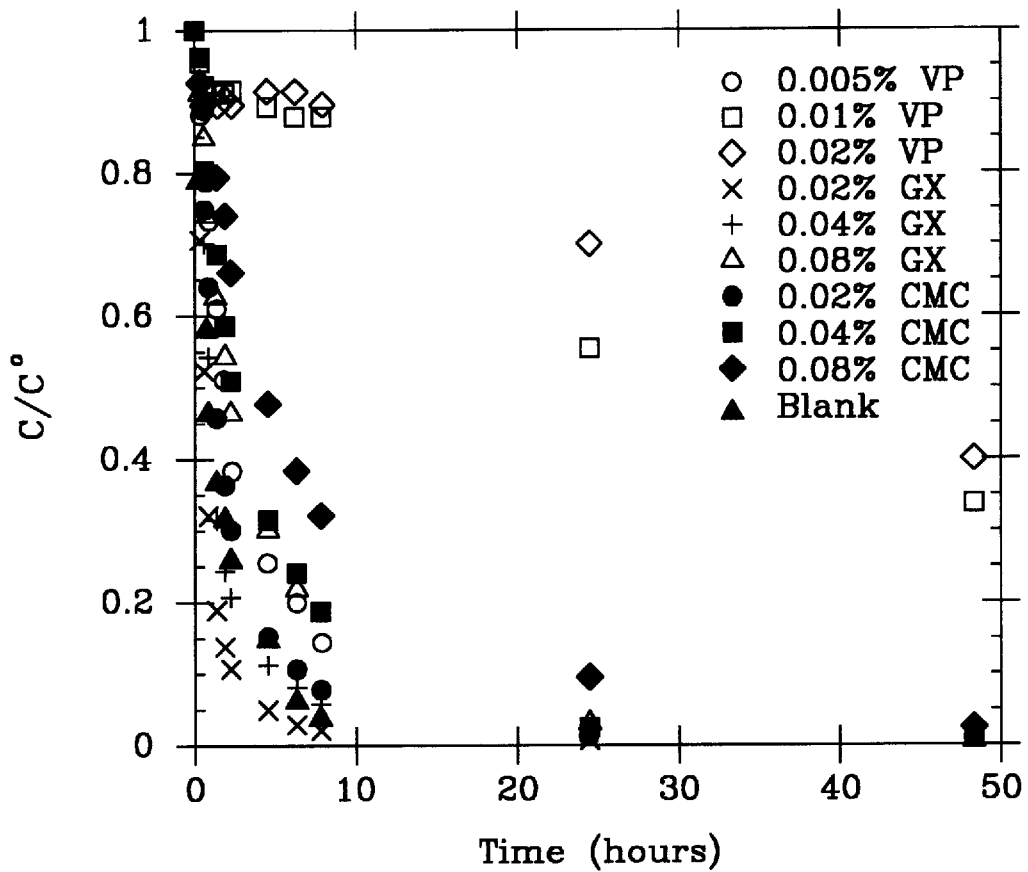
FIG. 1 is a graph of $C/C^0$ versus time for batch settling experiments for 0.2% $Fe^0$ colloids in vinyl polymer, gum xanthan, and carboxymethyl cellulose solutions of various concentrations.

A chemical barrier is a zone in subsurface environment that is capable of intercepting chemicals and preventing passage of the chemicals beyond the zone. First, a stable colloid suspension is made. This stable colloid suspension has preselected colloid concentration, colloid size, solution ionic strength. The stable colloid suspension may require a surfactant to maintain suspension of the colloid particles. Preferably, a non-Newtonian or shearthinning fluid is used. However, to avoid agglomeration of particles, it is preferred to first mix the particles with a surfactant then add the non-Newtonian fluid. A second step involves injecting the stable colloid suspension at a sufficiently high flow rate to move the colloids through the subsurface sediment, but not at such a high rate so as to induce resuspension of indigenous soil particles in the aquifer.

It is preferred that the non-Newtonian fluid be non-toxic compounds and be shearthinning. The non-toxic compounds are preferably soluble polymers because of their availability, including but not limited to synthetic high molecular weight polymers (e.g. vinyl polymer, polyacrylamide), biopolymers (e.g. gum xanthan, guar gum), a cellulose type polymer (carboxymethyl cellulose sodium salt), and combinations thereof.

There are at least two different techniques for injecting the colloid suspensions into the subsurface environment: by using conventional vertical wells and by using horizontal wells (also referred to as directionally drilled wells).

Using vertical wells, the stable colloid suspension is injected into the flow path of the contaminant plume while a withdrawal well draws the injected colloids in a direction perpendicular to the flow path of a contaminant plume. The withdrawal well, may then be used as an injection well, and a third well, in line with the first two wells, may then be used as a withdrawal well, thereby increasing the length of the colloid barrier. This process would continue until emplacement of the colloid barrier is complete.

Barriers may also be formed with horizontal wells. First the horizontal wells are installed across the flow path of the plume and then the colloid suspension is injected into the ground. Alternatively, two horizontal wells could be used, such that one well could be used to inject the colloid suspension while a nearby parallel well could be used to withdraw groundwater, thereby drawing colloids into the desired direction. The second well could be located above the first well to create a taller barrier, or could be place downstream of the first well to create a thicker barrier.

The hydraulic conductivity (K) of a particular aquifer material is a linear function of the viscosity of the fluid passing through it. Thus, for example, a 50 percent reduction in viscosity will double the value of K. By increasing the viscosity of a Newtonian colloidal $Fe^0$ suspension, the rate of gravitational settling of the $Fe^0$ particles will decrease; however, an increase in viscosity of the Newtonian colloidal suspension will also have the adverse effect of decreasing the effective hydraulic conductivity of the porous media. During the injection phase, use of shearthinning fluids in the formulation of a $Fe^0$ colloid suspension results in a high viscosity near the suspended $Fe^0$ particles (due to low shear stress of the fluid near the particles) and a lower apparent viscosity near the porous media surface, where the fluid is experiencing a high shear stress. These properties provide an $Fe^0$ colloid suspension solution that is both viscous enough to keep the $Fe^0$ particles in suspension for extended time periods enhancing colloid mobilization into the aquifer, without significantly decreasing hydraulic conductivity. It is preferred that the hydraulic conductivity be substantially the same as for water alone because the distance from the injection that the $Fe^0$ may be emplaced depends upon the pore velocity which directly depends upon the hydraulic conductivity. The VP solutions produced hydraulic conductivities which are nearly the same as that observed for water.

During the process of injecting the $Fe^0$ colloid slurry, some of the particles will be removed from solution by interception onto the aquifer matrix surfaces. As the velocity of the slurry decreases with its radial distance from the injection point, gravitational settling of the particles from the slurry becomes increasingly important. After the slurry has been injected its velocity will decrease to that of the natural groundwater flow and the $Fe^0$ colloids will fall out of solution with time. These particles will become cemented to the matrix material as they begin to corrode. The shearthinning fluid of the slurry or suspension will be subject to miscible displacement by the natural groundwater flow after the injection process is completed.

It is likely that colloid barrier formation through the use of either vertical or horizontal wells will be improved through the use of commercially available packers. A packer is an inflatable device that can be placed in an injection or withdrawal well to reduce the effective screened zone. By reducing the effective screened zone of the injection well, greater colloid injection velocities can be achieved. By reducing the effective screened zone of the withdrawal well, greater control of the colloid flow path can be achieved. Through modeling efforts and laboratory experimentation, we have identified injection velocity to be among the most limiting factors controlling colloid barrier formation.

The barrier thickness is expected to vary according to the reaction kinetics between the contaminant and colloid material, and environmental conditions, such as flow rate and groundwater composition. The barrier may be placed in horizontal or vertical orientations. Four distinct preferences of a zone made by the method of the present invention are 1) it is preferred to place a zone in a location where either the integrity and continuity of the zone is easily achieved and/or can be validated, 2) it is preferred that zones be made in subsurface locations having sufficient porosity and it is preferred to avoid low porosity (clay textured) sediments, 3) it is preferred that micron-sized materials be used for colloids, and 4) it is preferred that the amount of colloid added to a subsurface zone be less than about 5 vol % and more preferably less than 3 vol % of the pore space to avoid significant reduction in permeability of the subsurface zone.

The selection of the materials used in a chemical barrier or zone is dependent on the targeted contaminant, the remediation objective, and site conditions (such as competing ions, sediment texture, and water flow rate) Preferred materials are good sequestering agents, inexpensive and possess a sufficiently high hydraulic conductivity to promote groundwater flow through the chemical barrier. Materials useful according to the present invention include zeolite minerals, minerals modified with surface-bound chelates and quaternary amines, organic peat, limestone, titanium hydroxide, titanium oxide, fly ash, saw dust, lignite, hematite, magnetite, goethite, hydroxyapatite, andisols for anions, and zero-valent iron, $Fe^0$. Solid particle sizes of any or a combination of the above recited materials are preferably less than about 5 micron.

Zero-valent iron is preferred for its ability to remediate a wide range of groundwater contaminants. It is an extremely strong chemical reductant and has the capability to dehalogenate several halogenated-hydrocarbon compounds. Although less studied, $Fe^0$ can also chemically reduce several highly mobile oxidized oxyanions, for example $CrO_4^{2-}$, $MoO_4^{2-}$, and $TcO_4^-$ and oxycations, for example $UO_2^{2+}$ into their immobile forms. When a surfactant is used it may either be non-ionic or anionic. It is preferred that the surfactant is an anionic surfactant, for example Aerosil. In addition, it is preferred that the concentration of surfactant is less than a critical micelle concentration. When using iron colloids, surfactant concentration is at least about $10^{-4}$ vol %, and is preferably about 0.0001 vol % which has been shown to be optimal.

Because colloids remain in suspension longer for lower ionic strength, it is preferred that the colloidal solution has low ionic strength. In addition colloid suspension stability is improved by the presence of specific ions. Specifically it is preferred that the concentration of sodium relative to calcium is sufficient to maintain the colloids in suspension, but low enough to avoid dispersing the aquifer and causing plugging.

When zero-valent iron metal particles are used as the solid particles, suspensions of $Fe^0$ colloids (2±1 $\mu$m) are injected at a colloid injection rate, P≦0.01, and concentration, P≦0.05, to uniformly distribute colloids throughout soil columns at concentrations >0.3% (w/w), a concentration sufficient to make an effective chemical barrier for approximately 40 yr.

Column studies were conducted to evaluate the effect of colloid influent concentration and injection rate on colloid barrier formation. These studies revealed that 1) retained colloid concentration in the sediment bed is in part controlled by injection rate, 2) retained colloid concentration in the sediment bed is in part controlled by influent colloid concentration, 3) as colloid accumulated in the sediment (i.e., σ increased) the removal efficiency, λ, gradually decreased at a fairly uniform rate, 4) colloid accumulation in the sediment appeared to be controlled by gravitational settling and not diffusion or interception, 5) $Fe^0$ colloids were evenly distributed through out a 1-m-long column at concentrations >0.3% $Fe^0$, and 6) flow rates much greater than typical groundwater were required to move the $Fe^0$ colloids through these sand columns. This last point has an important practical ramification in that it suggests that once the $Fe^0$-colloid barrier is emplaced in an aquifer, it is highly unlikely that natural groundwater flow rates could continue moving the colloids, thereby further spreading the precipitated/sorbed contaminants.

The concentration of the $Fe^0$ colloids increased as the concentration of influent colloids increased, however, the retention efficiency, a ratio of the amount of colloids introduced into the column to the amount retained by the column, decreased at higher influent colloid concentrations. Influent colloid concentration preferably ranges from about 0.13 vol % to about 0.26 vol %. Average colloid concentrations in the sediment is preferably between about 0.13 vol % to about 0.4 vol %, most preferably about 0.3 vol %.

Injection rate, expressed as an injection velocity may range from about 0.15 cm/sec to about 0.61 cm/sec. Independent of influent colloid concentration, as the injection rate is increased, the colloid ($Fe^0$) concentration became more uniform through out the length of the column. The higher velocity kept the colloids in suspension longer thereby transporting them further before they were retained by the column. Hence, for uniformity of colloid distribution, it is preferred that the injection rate be between about 0.3 cm/sec to about 0.61 cm/sec.

Using very conservative assumptions applicable to the Hanford Site, it was determined that a barrier of 0.3 wt % $Fe^0$ and 3-m thick would remain active for over 40 yr (based on a mass balance equation of $Fe^0+H_2O+1/2O_2=Fe^{2+}+2OH^-$; a very fast groundwater flow rate of 157 m $yr^{-1}$, an aqueous phase saturated with dissolved $O_2$, 8 mg $L^{-1}$, bulk density of 1.6 g $cm^{-3}$, effective porosity of 0.22 $cm^3$ $cm^{-3}$). A barrier of 8% $Fe^0$ colloids would increase the effective life of the above barrier to over 1000 yr. A colloid barrier may be formed in sediments by injecting colloids and the concentration of retained colloids can be controlled by the influent colloid concentration and injection rate.

EXAMPLE 1

An experiment was conducted to evaluate the ability of a commercially available $Fe^0$ colloid (Product Number S3700; International Specialty Products, Wayne, N.J.) to remove an oxidized dissolved species from solution. The $Fe^0$ colloids used in these tests had a diameter of 2±1-$\mu$m, bulk density of 2.25 g $cm^{-3}$, particle density of 7.6 g $cm^{-3}$, Fe concentration of 98.1%, C and N concentrations of <1%, and O concentration of 0.7%. Uranyl was selected as an oxidized dissolved species for these tests because of its wide environmental concern at Department of Energy Sites and at uranium mining sites.

There were three treatments in the batch tests: the $Fe^0$ colloids, a negative control containing no $Fe^0$, and a positive control containing 800-$\mu$m $Fe^0$ filings (Fisher Scientific, Fair Lawn, N.J.). The $Fe^0$ colloid and positive control tests contain 5-g $Fe^0$ particles and 250-ml of a 10.0 mg $L^{-1}$ U [from $UO_2(NO_3)_2 \cdot 6H_2O$] solution made from a <0.45-$\mu$m-filtered groundwater sample. This uncontaminated groundwater sample was recovered from a surface aquifer located on the Hanford Site, Hanford, Wash. (Well 6-0S3-25). Table 1 shows the composition of the groundwater sample.

Glass vials were used in these batch experiments because earlier tests showed that a measurable amount of $Fe^{2+/3+}$ and $UO_2^{2+}$ were sorbed to the sides of plastic but not glass vials. After preparing the treatments, the glass vials were placed on an end-over-end mixer for 53 days, during which time $UO_2^{2+}$ concentrations in the aqueous phase were periodically determined. The control and treated solutions were sampled during the 53 days by letting the suspensions/solutions settle for an hour before removing and filtering (0.2-$\mu$m pore size; Millipore Co., Bedford, Mass.) a 5-ml aliquot from each vial. The resulting filtrates were analyzed for $UO_2^{2+}$ by laser induced kinetic phosphorescence spectroscopy (Chemchek Instruments Inc., Richland, Wash.). The detection limit for $UO_2^{2+}$ determination was 5 $\mu$g L$^{-1}$ and the analytical precision was ±2.8% at 25 $\mu$g L$^{-1}$.

TABLE 1

Chemical composition of groundwater.[a]

| Constituent | Concentration (mg L$^{-1}$) |
|---|---|
| pH | 8.14 (unitless) |
| Eh | 309.0 (mV) |
| B | 0.1 |
| Ba | 0.08 |
| Ca | 48.8 |
| K | 9.9 |
| Mg | 14.6 |
| Na | 32.1 |
| Si | 16.4 |
| Sr | 0.25 |
| F$^-$ | 0.5 |
| Cl$^-$ | 27 |
| SO$_4^{2-}$ | 75 |
| Total alkalinity (as CO$_3^{2-}$) | 67.5 |
| TOC | 1 |
| Cations | 5.29 |
| Anions | 4.60 |

[a]Groundwater sample passed through a 0.4-$\mu$m polycarbonate filter. Al, Cd, Cr, Co, Fe, Li, Mn, P, Pb, Zn, U, NO$_2^-$, NO$_3^-$, and PO$_4^{3-}$ were below detection limit, approximately 1 mg L$^{-1}$.

The ability of the $Fe^0$ colloids to remove $UO_2^{2+}$ from spiked Hanford groundwater was demonstrated. The positive control, containing 800-$\mu$m-$Fe^0$ filings, reduced the concentration of $UO_2^{2+}$ in solution from 10,000 $\mu$g L$^{-1}$ to about 0.9 $\mu$g L$^{-1}$ within 2 hr. The $Fe^0$ colloids also lowered the $UO_2^{2+}$ concentrations to about 1 $\mu$g L$^{-1}$, however there was a lag period of about 7 days before a significant amount of $UO_2^{2+}$ was removed from solution. The cause for this may be the presence of organic coatings of manufacturing origin on the colloids. After being in contact with the $UO_2^{2+}$-spiked groundwater for 3 days, an organic film appeared on the water/air interface. Tiny droplets of organic substances were observed rising from the settled colloids to the water/air interface. Once the organic film started to appear, gas bubbles also appeared and dissolved $UO_2^{2+}$ concentrations started to decrease. The gas bubbles were presumably $H_2$, a product of $Fe^0$ reduction of water. These observations suggest that as the organic material left the colloids, a reactive surface was exposed that had the capacity to remove the $UO_2^{2+}$ from solution. A 0.2% (v/v) HCl pretreatment for 5 min enabled the colloids to remove $UO_2^{2+}$ from solution immediately.

EXAMPLE 2

Column studies were conducted to evaluate the effects of influent colloid injection rate and concentration on colloid removal by a sand bed. The column used in these studies was made of polyvinylchloride (PVC) having a length of 0.23 m and a inner diameter of 0.051 m. Quartz sand was wet sieved to pass through a 0.85-mm sieve and be retained by a 0.425-mm sieve. The sieved sand was remoistened and packed into the columns. The aqueous phase of the influent consisted of 0.0001%. Aerosol, an anionic surfactant (Sigma Chemical Co., St. Louis, Mo.). This concentration is below the critical micelle concentration and was found to increase the length of time $Fe^0$ colloid remained in suspension by a factor of 2.5. The colloids described above were used in these studies at influent colloid concentrations of 0.001, 0.005, and 0.0% (w/w). The injection rates were 2.5, 5, 10, and 20 cm min$^{-1}$ (or 0.5, 1, 2, and 4 pore-volumes min$^{-1}$). Tracer tests using a 0.1 mM CaCl$_2$.H$_2$O were also conducted at 2.5, 5, and 20 cm min$^{-1}$ injection rates. Conductivity of the effluent from the tracer test was measured with an in-line probe. The analytical precision for the conductivity analyses was ±2%.

Deionized water was initially pumped into the bottom of the vertically oriented columns at a rate of 0.05 cm min$^{-1}$ for one day to remove fines and air. Before initiating a colloid injection experiment, all the water in the dead space between the influent colloid reservoir and sand bed was replaced with the influent colloid suspension. Preliminary experiments showed this step was necessary because mixing of the colloid suspension and the rinse water resulted in a poorly defined ("smeared") breakthrough curve.

Influent and effluent turbidity was measured using a Hach XR Turbidity Meter equipped with a flow through cell and a computer interface. For modeling purposes, the measured turbidity had to be converted into $Fe^0$ colloid concentrations. To accomplish this, separate five-point standard curves were created for each flow rate relating turbidity to $Fe^0$ concentrations. Turbidity values were as much as 20% higher in colloid solution introduced to the turbidity meter in flow mode as they were when the colloid solutions were introduced into the meter in batch mode. At higher flow rates, the meter apparently "saw" a larger streak of colloids as they moved passed the 1-cm window during the 0.001 sec diffraction measurement. The analytical precision for the turbidity analyses was ±4%.

Tracer studies were conducted to compare the transport rate of colloids to that of a conservative tracer, determine reproducibility of results, and estimate how much the effective pore volume decreased as flow rate increased. Reproducibility of the tracer tests was excellent. There was a slight decrease in effective pore volume as the flow rate decreased. Based on pore volumes defined by water weight in saturated columns, the 50% breakthrough at 5 cm min$^{-1}$ was 1.02 pore volumes (1 replication), at 10 cm min$^{-1}$ was 0.95±0.02 pore volumes (3 replications), and at 20 cm min$^{-1}$ was 0.93±0.04 pore volumes (4 replications). The effective pore volumes identified by these tracer tests were used in all subsequent calculations. The sharp rise and fall of the tracer concentrations indicate that the pore sizes are quite similar (there is little dispersion) and that tracer adsorption, albeit quite limited, is reversible.

Suspensions of $Fe^0$ colloids were introduced into sand columns at several flow rates and influent colloid concentration. Colloid capture by the sediment increased as the injection rate decreased. The experiment conducted at the slowest flow rate, 0.5 cm min$^{-1}$, showed that no colloids were in the effluent after 700 pore volumes. The 0.5 cm min$^{-1}$ flow rate is more than an order of magnitude greater than that of a very fast moving natural groundwater. This has important practical ramification in that it suggests that once the $Fe^0$-colloid barrier is emplaced in an aquifer, it is highly unlikely that natural groundwater flow can move the colloids, thereby further spreading the precipitated/sorbed contaminants. Additionally, as the $Fe^0$ colloids oxidize, they will cement to the sediment to further resist undesired movement after emplacement.

The other consistent trend in this study was that colloid capture increased as influent colloid concentrations increased. Increased colloid concentrations may increase colloid removal as a result of greater colloid aggregation causing 1) greater effective colloid size and subsequent straining and 2) greater effective colloid mass and subsequent settling.

EXAMPLE 3

Three additional column experiments were conducted to determine the distribution of retained colloids within the sand columns. These PVC columns were 0.05-m in diameter and 1-m in length. They were packed with similar sand as used in the above experiments. The influent consisted of 0.1%, 0.5%, and 1% (w/w) $Fe^0$ colloid in 0.001% Aerosol solutions. The injection rate was 4.6 cm $min^{-1}$. After injecting 10 pore volumes, the influent was switched to a 0.01M $CaCl_2$ solution pumped overnight (~6 pore volumes) at a rate of 0.03 cm $min^{-1}$. The $CaCl_2$ wash was meant to simulate the influx of groundwater that could potentially carry away $Fe^0$ colloids not held steadfast by the sand bed. Following the $CaCl_2$ wash, the columns were cut into 10-cm increments. The colloid concentrations in the sand collected from each 10-cm increment along the column were determined in three 0.5 to 5-g samples by dissolving the $Fe^0$ with 3.6M $H_2SO_4$ and then determining the amount of dissolved Fe by the o-phenanthroline calorimetric method (Olsen and Ellis, 1982). A negative control, sand without $Fe^0$ colloids, and a positive control, 0.1% (w/w) $Fe^0$ colloid, were carried through all analyses. The analytical precision for the $Fe^0$ colloid analyses was ±0.5%.

These three experiments were conducted with 1-m-long columns to determine the distribution of retained colloids within the sand columns. These columns received 10 pore volumes of suspensions containing 0.1, 0.3, and 1.0% $Fe^0$ colloids. As expected, the concentration of retained colloids increased in these columns as influent colloid concentrations increased. More importantly, the concentration of retained colloids was unexpectedly evenly distributed throughout the 1-m length of the column. An even distribution is ideal for colloid barrier formation. An uneven colloid distribution would require a greater amount of colloids be introduced into the subsurface to insure that a minimum colloid concentration exists through out the barrier zone.

The relative efficiency of the columns to remove colloids from the mobile phase can be estimated as a ratio of the colloid mass retained by the sand to the colloid mass introduced to the sand ([colloid]$_{influent}$×influent vol./[colloid]$_{sediment}$×sediment mass). The relative efficiency ratio of the column receiving 0.1%. $Fe^0$ was 1.8 g $g^{-1}$, 0.3% $Fe^0$ was 2.8 g $g^{-1}$, and 1.0% $Fe^0$ was 4.1 g $g^{-1}$. This data shows that not only does the concentration of retained colloids increase with influent colloid concentration, but the efficiency of the column to retain colloids also increases.

The clean-bed removal efficiency, $\lambda_0$, is a measure of the propensity of a sediment to remove colloidal material from the mobile phase. Statistical analysis by two-factor analysis of variance showed that $\lambda_0$ was significantly affected by influent injection rate ($P \leq 0.001$) and influent colloid concentration ($P \leq 0.05$). There may also be an interactive effect between colloid concentration and injection rate on $\lambda_0$. At lower flow rates, the effect of colloid concentration on $\lambda_0$ may be greater than at higher flow rates. It was not possible to test this statistically because of lack of replication.

Since this is the first time that $Fe^0$ colloids were injected into porous media, there are no $\lambda_0$ values in the literature for comparison. In this study, the 0.01% $Fe^0$ colloid/10 cm $min^{-1}$ trial resulted in a $\lambda_0$ of 0.01 $cm^{-1}$. The 0.01% $Fe^0$ colloid/20 cm $min^{-1}$ trial resulted in a $\lambda_0$ of 0.004 $cm^{-1}$.

Another measure of column efficiency may be determined from the data of the sediment colloid concentration. A removal efficiency ($\lambda_{sediment}$) based on mass of colloids retained by the column ($M_{retained}$) and mass of colloids introduced to the column ($M_{influent}$) can be calculated. The $\lambda_{sediment}$ value for the column receiving 0.1, 0.3, and 1.0% suspensions of $Fe^0$ were 0.008, 0.005 $cm^{-1}$, and 0.003 $cm^{-1}$, respectively. The $\lambda_{sediment}$ values are within the same order of magnitude as the $\lambda_0$ values presented for the other column experiments.

The effect of retained colloids on removal efficiency ($\lambda$), i.e., the removal efficiency of a nonclean bed, was also evaluated in these experiments. Retained colloids had an effect on removal efficiency once colloids collected in the sand beds. This effect is especially evident from the positive slope of the breakthrough curves beyond the sigmoidal region. The $C/C_0$ values continued to increase slowly as colloid filtration progressed ($\partial C/\partial t$ was always positive), suggesting that the rate of filtration decreased as colloids collected in the sand. The slopes in this plateau region generally decreased with increased injection rate. Influent colloid concentration did not appear to have any affect on these slopes.

Based on filtration theory, interception played a relatively minor role in colloid retention during these experiments. The interception depends entirely on the size ratio of the colloids to the sediment particles. In these experiments, this ratio was 0.0032. Maroudas and Eisenklam (1965) reported that interception is essentially nonexistent at ratios less than 0.065.

Diffusion, $_D$, also did not appear to be an important component to colloid retention in these experiments. Calculations indicated that diffusion had only a slightly greater impact on collector efficiency than interception. The high flow rates used in these studies likely overpowered most diffusion effects. The other reason that diffusion may not have been an important mechanism controlling colloid removal is because the $Fe^0$ colloids may have been too large. Yao et al., (1971) showed that $_D$ affects the total collector efficiency when the colloid diameter is less than 1-$\mu$m. In these experiments, the $Fe^0$ colloids had diameters between 1 and 3 $\mu$m.

Gravitational settling likely controlled colloid removal by the sediment. The experimentally derived values were most similar in magnitude and followed the trend of gravitational settling.

EXAMPLE 4

An experiment was conducted to demonstrate three shearthinning fluids with $Fe^0$ as colloids for emplacement in columns containing coarse-grained sand. Commercially available $Fe^0$ colloids (Product Number S3700; International Specialty Products, Wayne, N.J.) were used. The colloids had a diameter of 2±1 $\mu$m, bulk density of 2.25 g $cm^{-3}$, particle density of 7.6 g $cm^{-3}$, Fe concentration of 98.1%, C and N concentrations of <1%, and O concentration of 0.7%.

Three non-toxic polymers were investigated: vinyl polymer, VP, product name Slurry Pro CDP obtained from K. B. Technology, Chattanooga, Tenn., gum xanthan, GX, and carboxymethyl cellulose sodium salt, CMC. GX and CMC were obtained from Sigma Chemical Co.

A series of batch settling experiments were conducted using solutions containing 0.2% (w/w) iron colloids, 0.001% anionic surfactant (Aerosol, Sigma Chemical Co.) and various concentrations of the polymers. Inclusion of this surfactant increased the length of time the colloids remained in suspension by 250%. A blank (or control) was included which contained only the anionic surfactant and the iron colloids, but no polymer.

All non-Newtonian suspensions were made by first adding the anionic surfactant to water. The $Fe^0$ colloids were then dispersed in the surfactant solution and finally the polymer was added to the $Fe^0$-surfactant suspension. If the surfactant was not added before the polymer, the $Fe^0$ colloids would form into clumps and not disperse.

The viscosity of the polymer solutions at various concentrations were measured with Ubbelohde type viscometers immersed in a constant temperature water bath at $25.0°\pm0.1°$ C. The measurements were conducted according to manufacturer's (Cannon Instrument Co., State College, Pa.) instructions. Turbidity measurements were used to measure the concentration of $Fe^0$ colloids in 35 ml sample vials (8 cm in length) as a function of time. Well mixed suspensions were added to the sample vials and allowed to settle while turbidity measurements were taken over time. The turbidimeter measures the turbidity at the center of the vial (half-way from the bottom of the vial). Turbidity was measured using a Hach 2100AN turbidimeter. The analytical precision for the turbidity analyses was ±4%.

Column Injection

Columns were 1.0-m long sand columns (with the exception of one 3.05-m long column) constructed with PVC pipe with a 4.4-cm inner diameter. The ends of the columns were fit with PVC tapered reducers to provide an even distribution across the cross-sectional area of the sand column. The tapered reducers were connected to 12.7-mm outer diameter, 7.9-mm inner diameter flexible (Tygon) tubing. A piece of 390-mesh (36-$\mu$m openings) nylon screening located between the ends of the PVC column and the tapered reducer was used to act as a bed support. Most columns were filled with washed 20–30 mesh (0.84 mm–0.60 mm) quartz sand (Accusand, Unimin Corporation, Le Sueur, Minn.). Additional columns were filled with 30–40 mesh (0.60 mm–0.42 mm) and 40–50 mesh (0.42 mm–0.30 mm) sand. The columns were packed to an average porosity of 32±2%. The columns were placed in a horizontal orientation during the injection of the $Fe^0$ colloid slurry. The pressure at the inlet of the columns was measured using a pressure gauge to observe any effects that the non-Newtonian fluids had on the hydraulic conductivity (K) of the columns and to determine whether emplacement of the iron colloids would affect K. K was determined with Darcy's Law:

$$v = K(P_1 - P_2)/L \quad (1)$$

where v is the Darcy velocity, $P_1$ and $P_2$ are the inlet and outlet pressure, L is the column length. To determine the hydraulic conductivity, $P_2$ is assumed to be atmospheric pressure.

Colloid suspensions (1.0% w/w) were pumped into the columns using a Lab Pump (Model QD-1, Fluid Metering Inc., Oyster Bay, N.Y.). Darcy flow velocities used in these experiments were 0.154 cm $sec^{-1}$, 0.051 cm $sec^{-1}$, and 0.010 cm $sec^{-1}$. Each column received 3, 10 or 30 pore volumes of $Fe^0$ colloid suspension. After injection of the colloid suspension into the column, an influent solution of 0.01M $CaCl_2$ was pumped overnight at a rate of 0.003 cm $sec^{-1}$ (~2 pore volumes). The $CaCl_2$ flush was meant to simulate the influx of groundwater that could potentially carry away $Fe^0$ colloids that remained in suspension.

Following the $CaCl_2$ flush, the columns were cut into 10-cm increments. The colloid concentrations in the sand collected from each 10-cm column increment were determined in two 0.5 to 3-g samples (dry). The $Fe^0$ in the column sand samples were dissolved in 3.6M $H_2SO_4$ and then the concentration of dissolved Fe was determined by the o-phenanthroline calorimetric method (Olsen and Ellis 1982). A negative control, sand without $Fe^0$ colloids, and a positive control, 0.001, 0.005 or 0.01 (w/w) $Fe^0$ colloid, were carried through all analyses. The analytical precision for the $Fe^0$ colloid analyses was ±0.5%.

Results

Batch Settling Experiments

Results of the batch settling experiments are illustrated in FIG. 1. $T_t$ indicates the turbidity as a function of time, $T_0$ indicates the initial turbidity at time zero. At the concentrations used in the experiment, VP is clearly the best polymer for reducing the gravitational settling of the $Fe^0$ particles. CMC also decreased the settling rate of the $Fe^0$ particles, but it was less effective than VP. GX was the least effective polymer at reducing the settling rate of the iron particles. At the two lowest GX concentrations, 0.02 and 0.04%, the settling rate was in fact increased relative to the blank. It was observed that samples of $Fe^0$ colloids on sand collected from the column experiments that had been in contact with GX solutions would corrode much faster than was observed for other solutions.

Column Injection Experiments

Three concentrations (0.005%, 0.01% and 0.02%) of VP, and two concentrations (0.04% and 0.08%) of GX and CMC were tested. Iron concentrations measured in the sand columns as a function of column length for VP, GX, and CMC, respectively, for an injection rate of 0.154 cm $sec^{-1}$, and a throughput of 3 pore volumes are plotted in FIGS. 2, 3, and 4.

Figure 2:
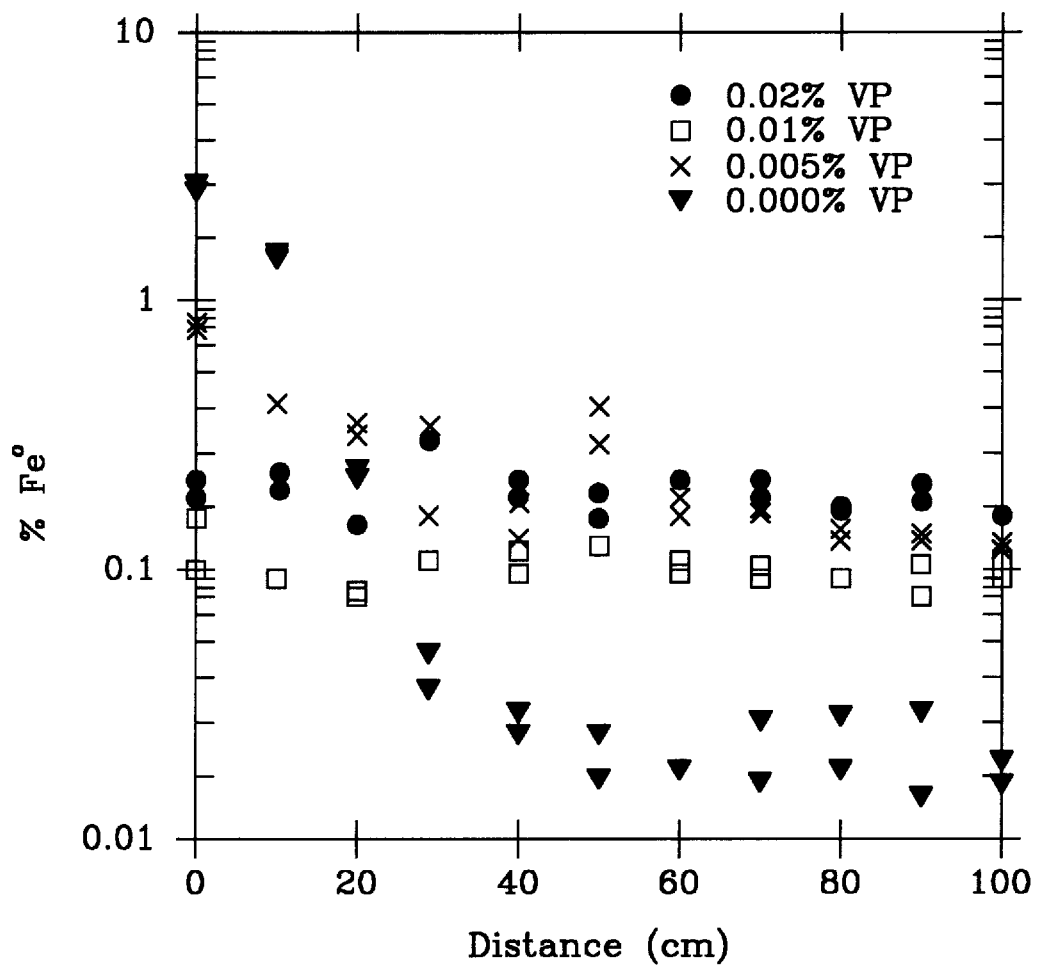
FIG. 2 is a graph of % $Fe^0$ (concentrations) versus distance retained in 1.0-m long sand columns obtained with VP injection solutions at three concentrations.
Figure 3:
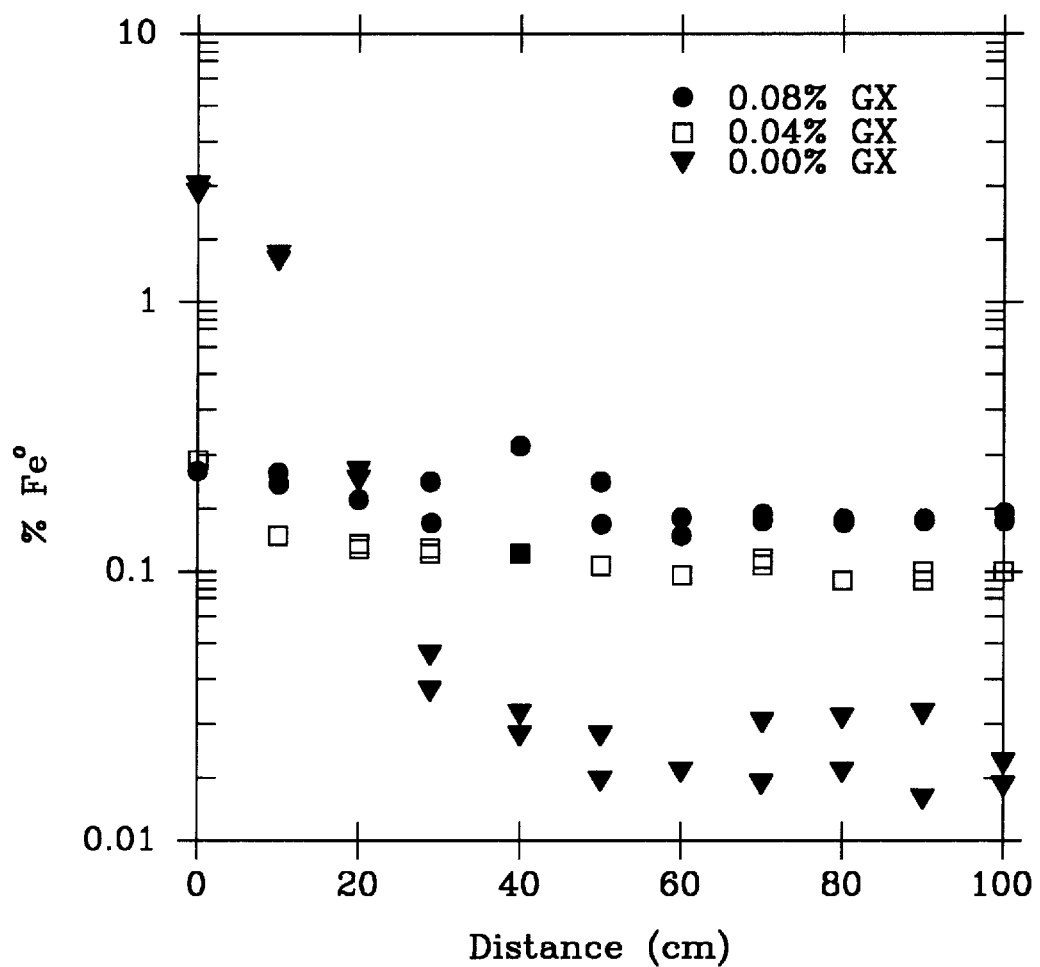
FIG. 3 is a graph of % $Fe^0$ (concentrations) versus distance retained in 1.0-m long sand columns obtained with GX injection solutions at two concentrations.
Figure 4:
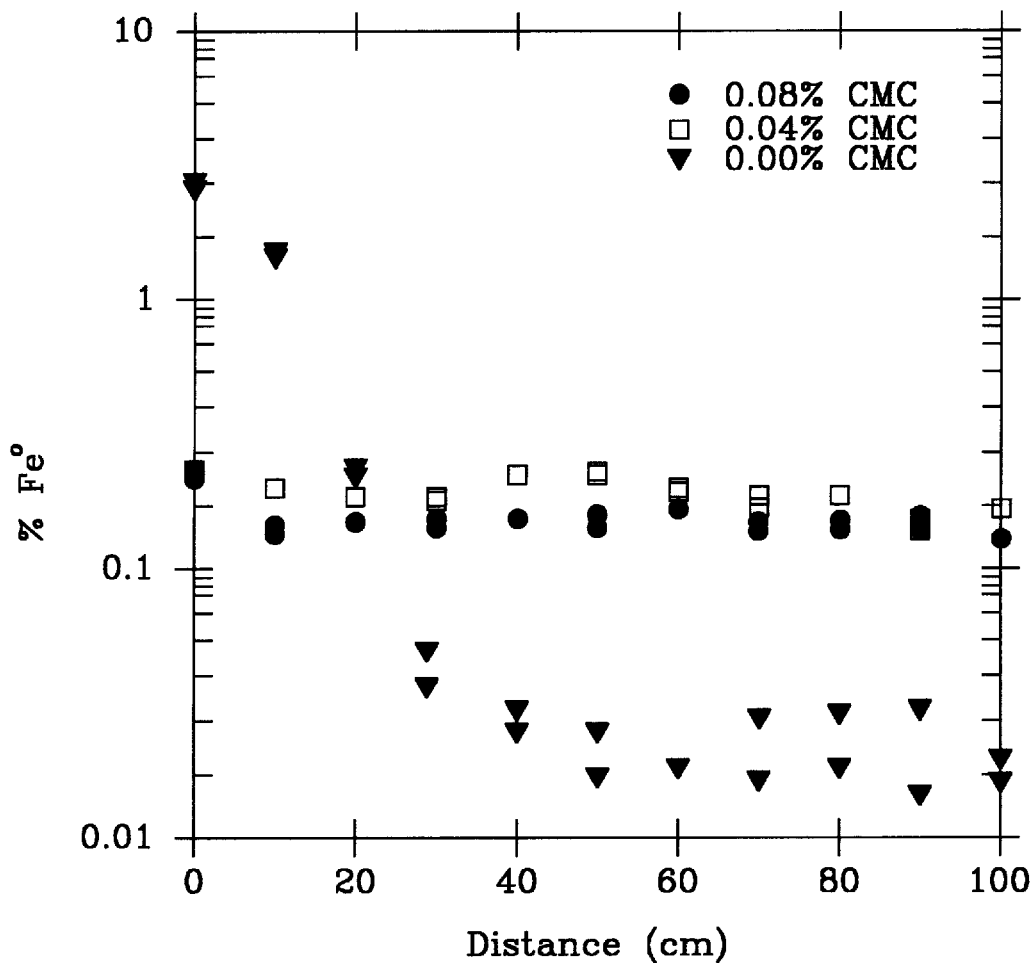
FIG. 4 is a graph of % $Fe^0$ (concentrations) versus distance retained in 1.0-m long sand columns obtained with CMC injection solutions at two concentrations.

Results obtained for an experiment containing no polymer (0.0% VP, GX, and CMC respectively) was also included for comparison in FIGS. 2, 3, and 4. In FIG. 2, it is apparent that when no VP is added, the distribution of iron within the column is greatest at the inlet and rapidly decreases with distance from the inlet. At the lowest VP concentration (0.005%), increased filtration of the $Fe^0$ colloids near the inlet is also evident; however, the decrease in $Fe^0$ concentration with distance from the inlet is much less than for the case with no polymer added. For the higher concentrations of VP (0.01% and 0.02%) the distributions of $Fe^0$ throughout the columns are essentially uniform. This is a desirable attribute for a chemically reactive barrier because this resulted in the most efficient utilization of the reactant.

Injection experiments conducted with GX and CMC at both concentrations tested also produced very flat distribution profiles of $Fe^0$ with the column (FIGS. 3 and 4). These results show that the each of the polymers tested are very effective at reducing gravitational settling of the $Fe^0$ colloids within the sand columns.

The results of the viscosity measurements of the polymeric solutions, pressure measurements in the column experiments, and the hydraulic conductivity values calculated from the final pressure measurements and Darcy's Law are listed in Table 1. Surprisingly, the slowest settling rates of the $Fe^0$ colloids shown in FIG. 1 do not correspond to highest measured viscosities reported in Table 1. For example, the 0.01% and 0.02% VP solutions have similar viscosities to the GX solutions but much lower viscosities than the CMC solutions (at 0.154 cm/sec). In addition, the back pressures developed with VP tended to be very low, nearly the same as pure water. The back pressures observed for GX solutions with similar viscosities to the VP solutions were significantly higher. The implications of these results are that although each of the polymers is able to prevent gravitational settling of $Fe^0$ colloids during injection into porous media, VP is superior with respect to maintaining the highest hydraulic conductivity within the sand columns. In fact, the VP solutions produced hydraulic conductivities which are nearly the same as that observed for water.

Figure 5:
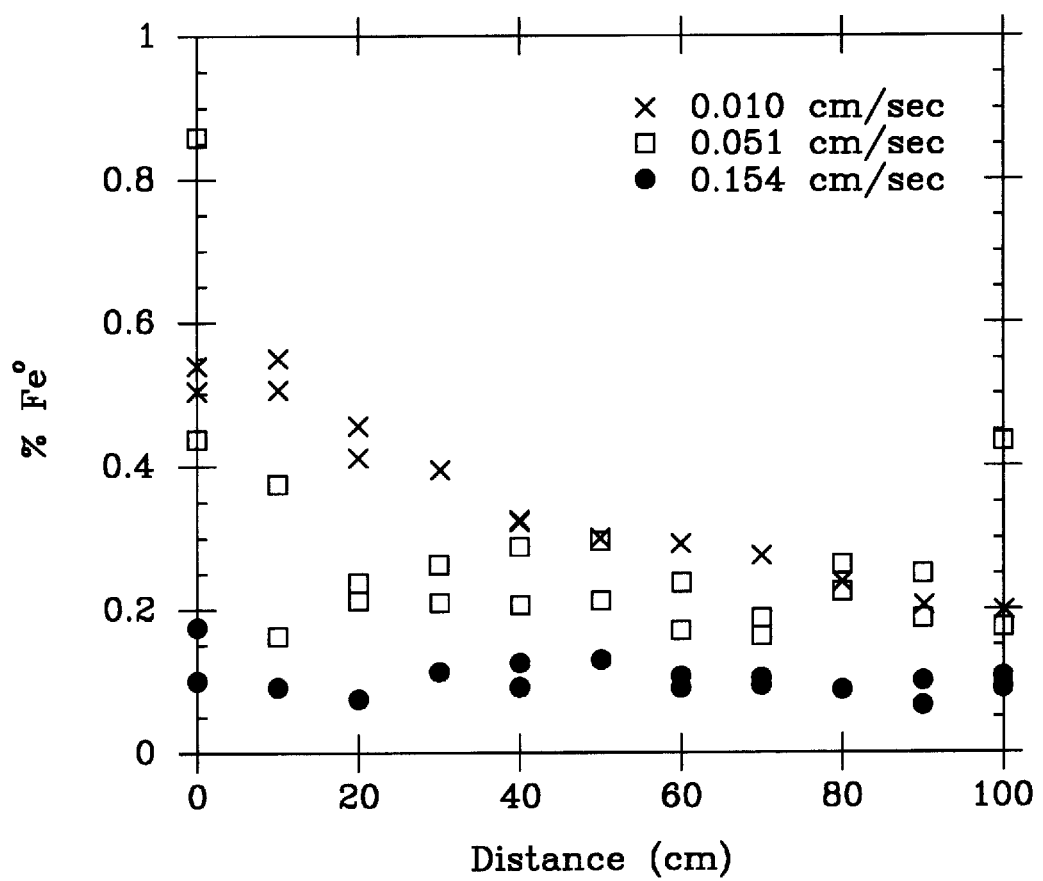
FIG. 5 is a graph of % $Fe^0$ (concentrations) versus distance retained in 1.0-m long sand columns obtained with 0.01% VP injection solution injected at three flow rates.

Further experimental testing of the effects of shearthinning solutions on the injection of $Fe^0$ colloids was limited to VP. Results of three column experiments conducted with 0.01% VP, an injection rate of 0.154 cm $sec^{-1}$, and variable throughput (3, 10, and 30 pore volumes) are illustrated in FIG. 5. In each case the iron concentration profile along the column remains nearly uniform. The average $Fe^0$ concentration throughout the column is proportional to the throughput (i.e. 3 PV≈0.1%, 10 PV≈0.3%, and 30 PV≈1.0%).

EXAMPLE 5

Further experiments using non-Newtonian slurries or suspensions were conducted to observe the effects of varying flow rate, particle size.

Figure 6:
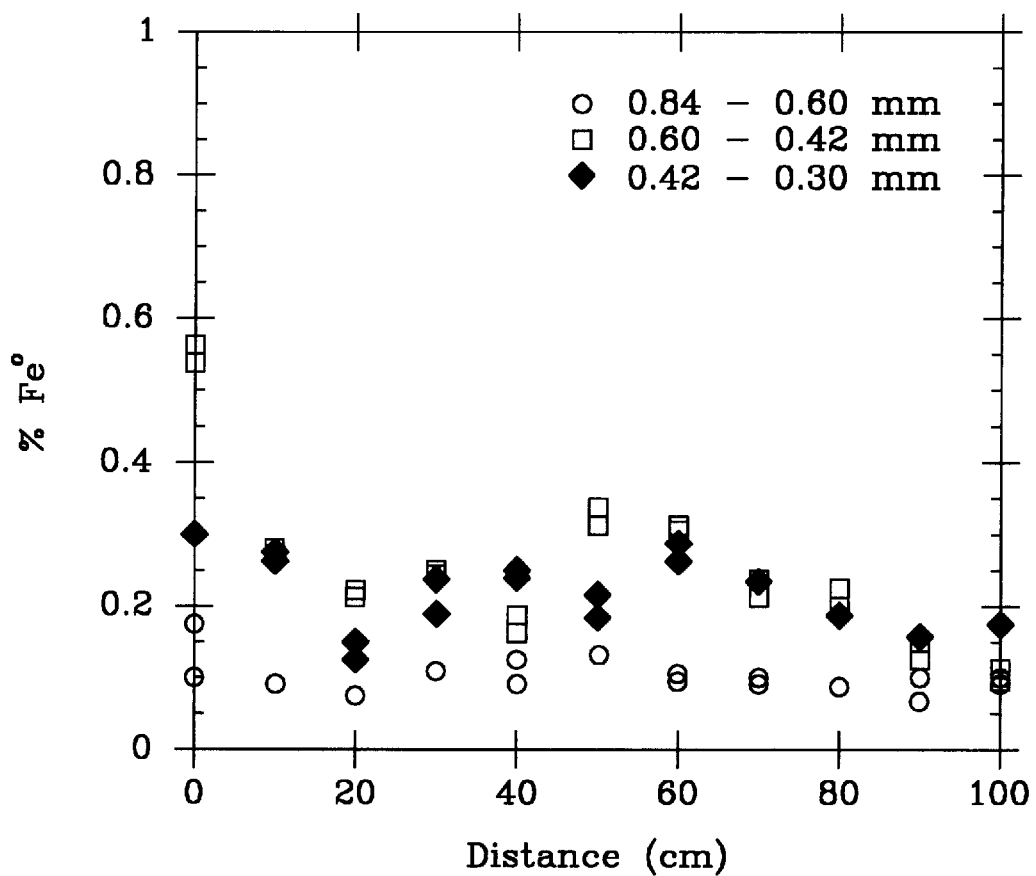
FIG. 6 is a graph of % $Fe^0$ (concentrations) versus distance retained in 1.0-m long sand columns obtained with 0.01% VP injection solution for three particle size ranges of porous media.

Darcy velocities used in these experiments were 0.154 cm $sec^{-1}$, 0.051 cm $sec^{-1}$, and 0.010 cm $sec^{-1}$. Three pore volumes of 0.01% VP solution was used each of these experiments. Results are shown in FIG. 6. As observed in Example 4, the iron concentrations within the 0.154 cm $sec^{-1}$ column are relatively flat. For the lower flow rates significantly higher iron concentrations are emplaced within the columns. Additionally, the concentration profiles become increasingly curved, with more iron being emplaced near the inlet of the column as the injection rates are decreased. This is likely the result of increasing gravitational settling as the flow rate is decreased.

The effect of particle size of the porous media was evaluated by conducting three column injection experiments with three different particle size ranges of sand (0.30 mm–0.42 mm, 0.42 mm–0.60 mm, and 0.60 mm–0.84 mm). These experiments were conducted at 0.01% VP, 0.154 cm $sec^{-1}$ darcy velocity, and a three pore volume throughput (FIG. 6). The two experiments conducted with the two smaller particle size ranges (0.30 mm–0.42 mm and 0.42 mm–0.60 mm) removed more iron colloids from solution than did the largest particle size range (0.60 mm–0.84 mm). Results from each of these experiments produced fairly flat iron concentration profiles; however, there was more variability in the results from the 0.42 mm–0.60 mm and 0.30 mm–0.42 mm experiments than for the 0.60 mm–0.84 mm mesh experiment. In addition, the 0.42 mm–0.60 mm and 0.30 mm–0.42 mm results were nearly the same. $Fe^0$ concentrations in the 0.60 mm–0.84 mm column were consistently less than the two smaller particle size ranges. This is likely the result of larger pores in the 0.60 mm–0.84 mm particle size column, which permitted the $Fe^0$ colloids to pass through the column more freely.

Figure 7:
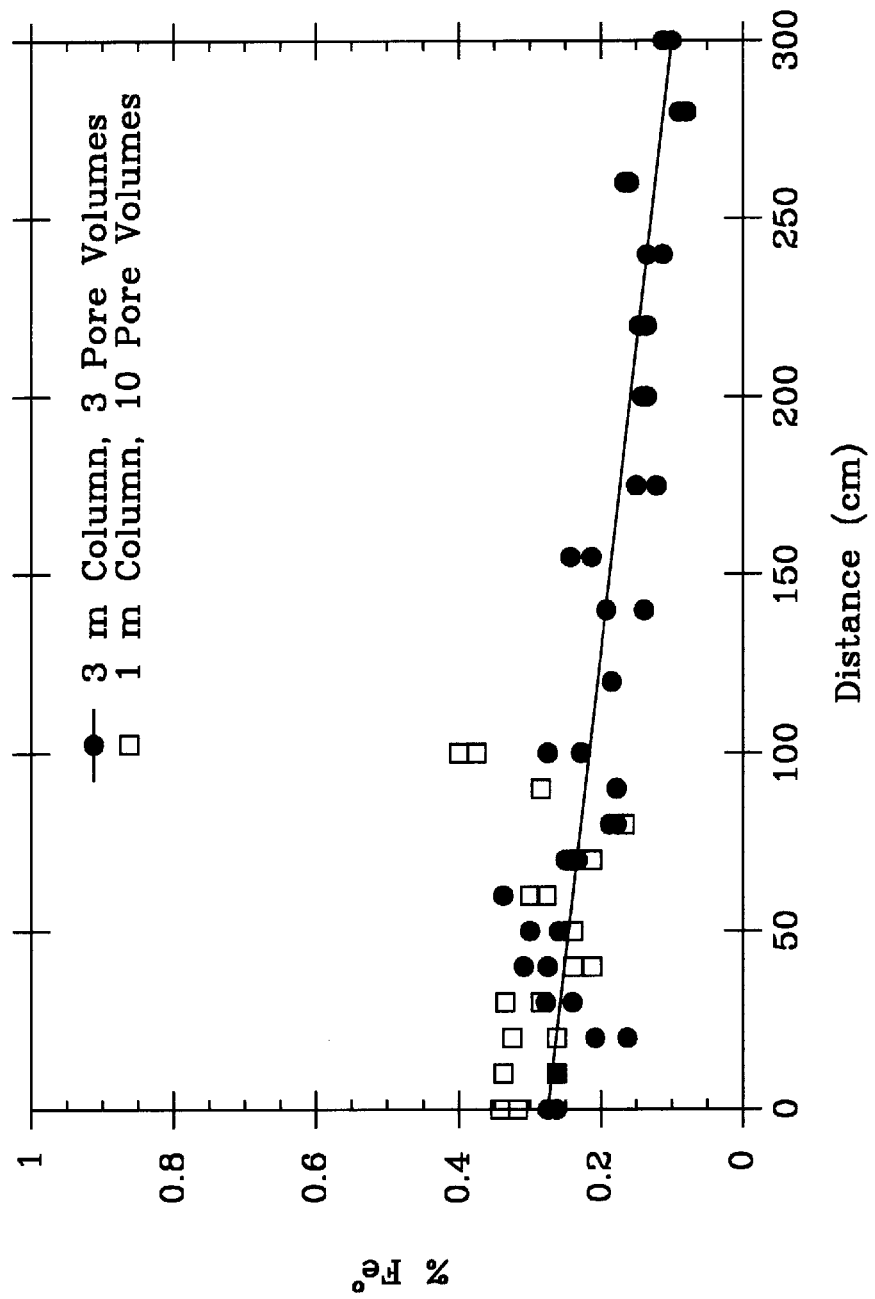
FIG. 7 is a graph of % $Fe^0$ (concentrations) versus distance retained in 3.0-m and 1.0-m long sand columns obtained with 0.01% VP injection solution.

To test the effectiveness of the VP for enhancing the emplacement of $Fe^0$ colloids in porous media for greater distances, a 3-m long column experiment was conducted. In this case, the suspension of 1.0% $Fe^0$ colloids in 0.01% VP was injected at a darcy velocity of 0.154 cm $sec^{-1}$, and a three pore volume throughput (FIG. 7). For the 3-m long column, three pore volumes is equivalent to 9 pore volumes for a 1-m long column; therefore, the results of the 1-m long column experiment conducted at 10 pore volumes (other parameters being the same) was included on the plot for comparison. In the 3-m column, the concentrations of iron in column decrease from approximately 0.27% at the inlet to approximately 0.10% at the outlet. The decrease in concentration with distance appears to be linear. The results from the 1-m column are consistent with the 3-m column results.

CLOSURE

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method of injecting solid particles into subsurface soil, comprising the steps of:
   (a) making a colloid suspension having said solid particles in water;
   (b) adding a surfactant to said suspension and further adding a non-Newtonian fluid thereby making a non-Newtonian stable colloid suspension; and
   (b) injecting the stable colloid suspension into the subsurface soil through a well at a flow rate sufficient to move the stable colloid suspension through the subsurface sediment and without substantially resuspending indigenous soil particles in the subsurface soil.

2. The method as recited in claim 1, wherein said solid particles are selected from the group of zeolite minerals, minerals modified with surface-bound chelates and quaternary amines, organic peat, limestone, titanium hydroxide, titanium oxide, fly ash, saw dust, lignite, hematite, magnetite, goethite, hydroxyapatite, andisols for anions, and zero-valent iron ($Fe^0$).

3. The method as recited in claim 2, wherein said particles have a size less than 5 micron.

4. The method as recited in claim 3, wherein said particles have a size of about 1 to 2 micron.

5. The method as recited in claim 1, wherein the colloid concentration is less than about 0.26 vol %.

6. The method as recited in claim 1, wherein an amount of the colloid added to the subsurface soil is less than about 5 vol % of a pore space.

7. The method as recited in claim 6, wherein the amount of the colloid added to the subsurface soil is less than about 3 vol % of a pore space.

8. The method as recited in claim 1, wherein a surfactant is added to the stable colloidal suspension.

9. The method as recited in claim 8, wherein a concentration of the surfactant is less than a critical micelle concentration.

10. The method as recited in claim 1 wherein the amount of said solid particles is about 0.2% (w/w).

11. The method as recited in claim 1, wherein the amount of surfactant is about 0.001% (w/w).

12. The method as recited in claim 1 wherein said surfactant is an anionic surfactant.

13. The method as recited in claim 1, wherein said solid particles are $Fe^0$.

14. The method as recited in claim 1, wherein said non-Newtonian fluid is a shearthinning fluid.

15. The method as recited in claim 1, wherein said non-Newtonian fluid is a soluble polymeric solution.

16. The method as recited in claim 15, wherein said soluble polymeric solution is selected from the group of vinyl polymer, polyacrylamide, gum xanthan, guar gum, caroxymethylcellulose and combinations thereof.

17. A method of making a subsurface chemically reactive zone, comprising the steps of:
 (a) making a colloid suspension having said solid particles in water;
 (b) adding a surfactant to said suspension and further adding a non-Newtonian fluid thereby making a non-Newtonian stable colloid suspension; and
 (b) injecting the stable colloid suspension into the subsurface soil through a well at a flow rate sufficient to move the stable colloid suspension through the subsurface sediment and without substantially resuspending indigenous soil particles in the subsurface soil.

18. The method as recited in claim 17, wherein said reactive solid particles are selected from the group of zeolite minerals, minerals modified with surface-bound chelates and quaternary amines, organic peat, limestone, titanium hydroxide, titanium oxide, fly ash, saw dust, lignite, hematite, magnetite, goethite, hydroxyapatite, andisols for anions, and zero-valent iron ($Fe^0$).

19. The method as recited in claim 18, wherein said reactive solid particles have a size less than 5 micron.

20. The method as recited in claim 19, wherein said reactive solid particles have a size of about 1 to 2 micron.

21. The method as recited in claim 17, wherein the reactive solid particle concentration is less than 3 wt %.

22. The method as recited in claim 17, wherein an amount of the reactive solid particles added to the subsurface soil is less than about 5 vol % of a pore space.

23. The method as recited in claim 22, wherein the amount of the reactive solid particles added to the subsurface soil is less than about 3 vol % of a pore space.

24. The method as recited in claim 17, wherein a surfactant is added to the stable colloidal suspension.

25. The method as recited in claim 24, wherein a concentration of the surfactant is less than a critical micelle concentration.

26. The method as recited in claim 17 wherein the amount of said solid particles is about 0.2% (w/w).

27. The method as recited in claim 17, wherein the amount of surfactant is about 0.001% (w/w).

28. The method as recited in claim 17 wherein said surfactant is an anionic surfactant.

29. The method as recited in claim 17, wherein said solid particles are $Fe^0$.

30. The method as recited in claim 17, wherein said non-Newtonian fluid is a shearthinning fluid.

31. The method as recited in claim 17, wherein said non-Newtonian fluid is a soluble polymeric solution.

32. The method as recited in claim 31, wherein said soluble polymeric solution is selected from the group of vinyl polymer, polyacrylamide, gum xanthan, guar gum caroxymethylcellulose and combinations thereof.

* * * * *

UNITED STATES PATENT AND TRADEMARK OFFICE
CERTIFICATE OF CORRECTION

PATENT NO. : 5,857,810
DATED : 01/12/1999
INVENTOR(S) : Cantrell et al.

It is certified that error appears in the above-identified patent and that said Letters Patent is hereby corrected as shown below:

In column 8, line 13, please replace "0.0%" with –0.01%--.

Signed and Sealed this

Twenty-fourth Day of April, 2001

Attest:

NICHOLAS P. GODICI

Attesting Officer   Acting Director of the United States Patent and Trademark Office